Patented Apr. 6, 1926.

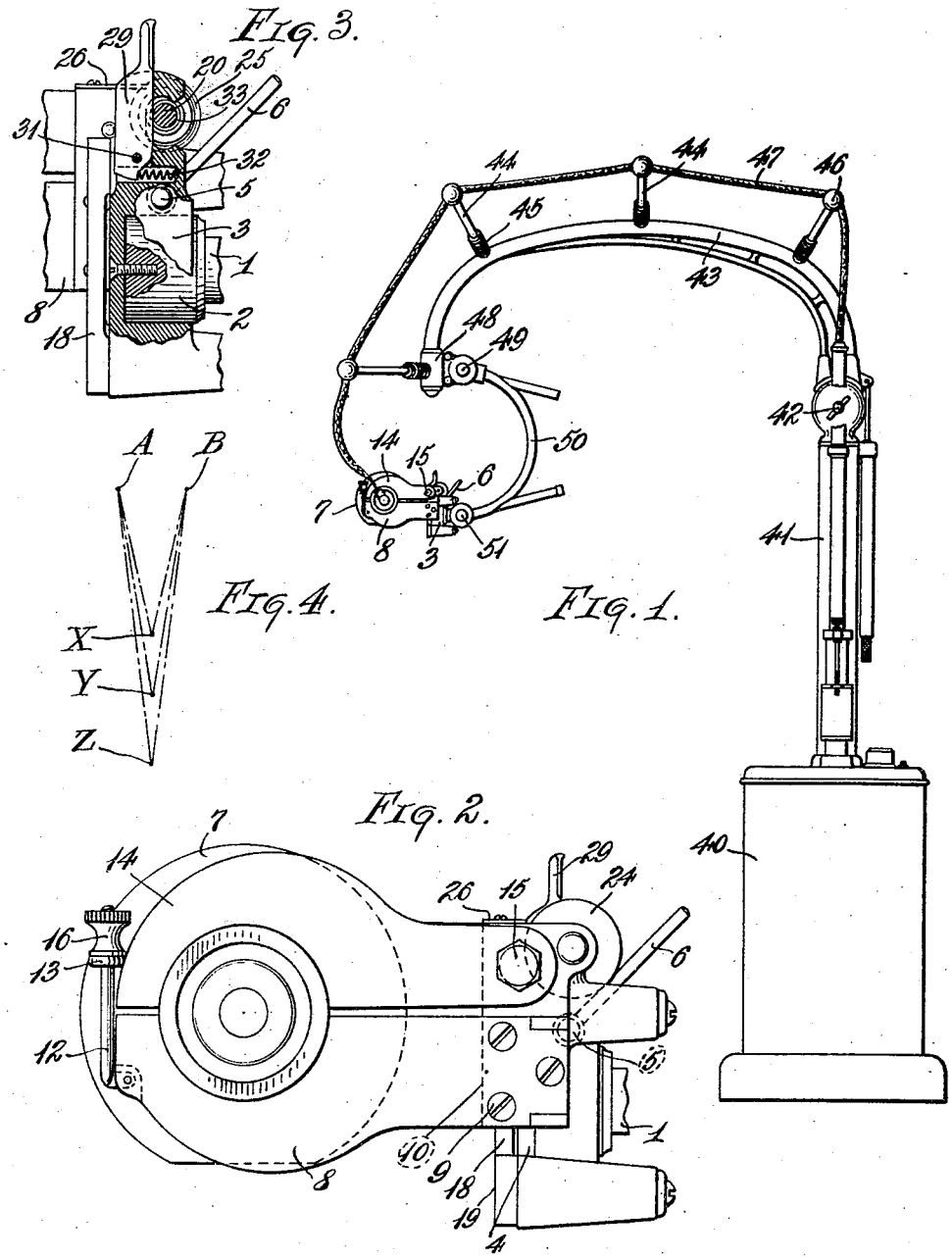

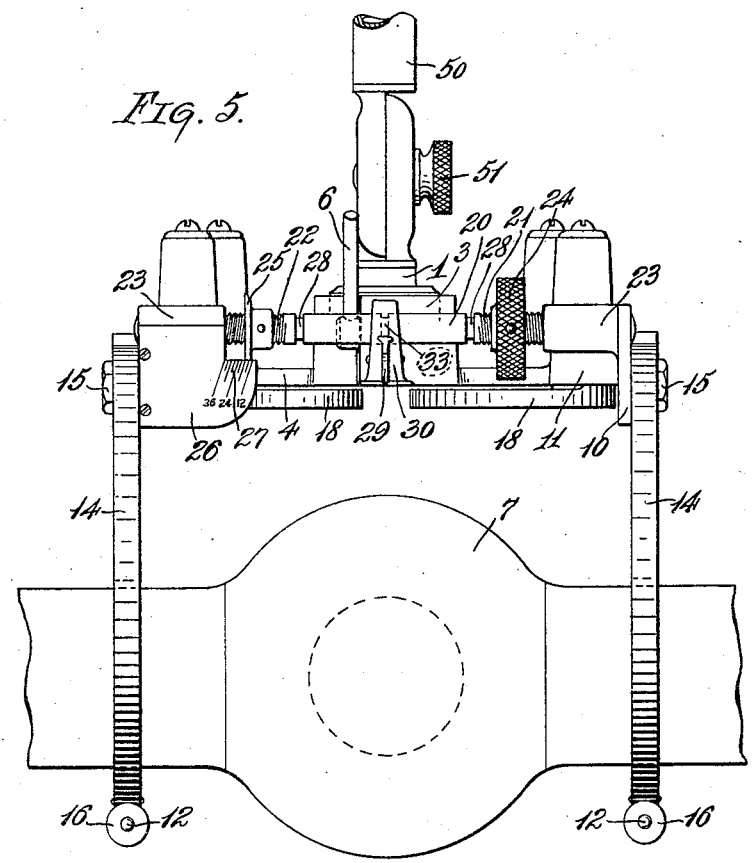
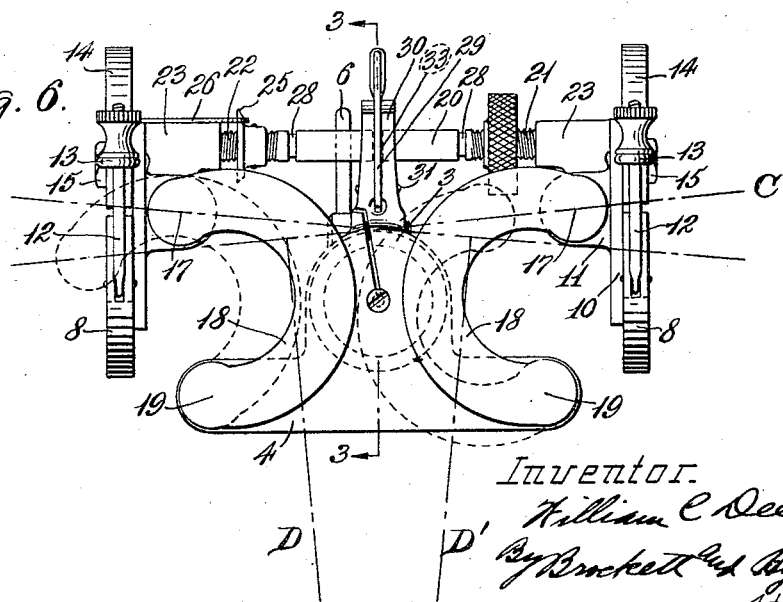

1,579,212

UNITED STATES PATENT OFFICE.

WILLIAM C. DEE, OF CLEVELAND, OHIO.

ELECTRICAL APPARATUS.

Application filed July 31, 1919. Serial No. 314,532.

*To all whom it may concern:*

Be it known that I, WILLIAM C. DEE, a citizen of the United States, residing at Cleveland, in the county of Cuyahoga and State of Ohio, have invented certain new and useful Improvements in Electrical Apparatus, of which the following is a specification.

This invention relates to stereoscopic attachments for X-ray machines.

One object of the invention is to provide improved apparatus for taking stereoscopic X-ray pictures, and more specifically to improve the mounting for the tube to enable it to be readily adjusted for the two exposures without separate adjustment of screws, clamps or other devices in the two positions of the tube.

A further object of the invention is to provide apparatus of this kind which enables X-ray photographs to be taken at any desired distance, within limits, from the object and which nevertheless enables the tube to be moved to its two positions in a simple manner but with all required accuracy.

A further object of the invention is to enable the inclination of the rays from the focal spot in the tube to the plate to be exposed or to the surface on which it lies to be varied to correspond with the distance of the focal spot from the plate, said adjustment being accomplished without affecting the pupillary distance between the two positions of the tube for the two exposures.

Further objects of the invention are in part obvious and in part will appear more in detail hereinafter.

In the drawings, which represent one embodiment of the invention, Fig. 1 is a side elevation of a complete stereoscopic X-ray machine; Fig. 2 is a side elevation, on a larger scale of the X-ray attachment; Fig. 3 is a detail side elevation of the base or body portion of said attachment, the tube supports being omitted and said view being partly in section on the line 3—3, Fig. 6; Fig. 4 is a diagrammatic view; Fig. 5 is a plan view of the stereoscopic attachment; and Fig. 6 is a front elevation thereof.

In taking stereoscopic X-ray photographs the object to be photographed is laid above or on the plate to be exposed and the X-ray tube is placed above the object at the proper distance to bring out the object or portion thereof in the desired size. As in all stereoscopic pictures two exposures are made with the object lying in the same position, the X-ray tube being shifted laterally between said exposures the pupillary distance, i. e., the distance between average eyes. Referring to Fig. 4, A and B represent the two points at which the tube is located for the two exposures, the distance therebetween being the pupillary distance. When exposures are made with the plate located at various distances from the tube, say at the points X, Y or Z, the angle of inclination to each other of the two beams of light from the tube in its two positions to the plate increases as the plate is located nearer to the tube. No matter what is the distance of the plate from the tube the two positions of the tube remain the same, as they are always separated by the pupillary distance.

In prior X-ray apparatus it has been necessary to not only shift the tube from one position to the other for the two exposures, but to also make as accurately as possible such adjustment of the tube in said positions as to produce proper inclination of its beam or ray to the plate. The present invention, among other things aims to provide simple means for producing this necessary adjustment.

Referring to the drawings, the apparatus shown includes an X-ray attachment shown in Fig. 2 and which is designed for connection to any suitable support, one such support being hereinafter described. 1 indicates the shank or stem of the attachment by which it is connected to the support. This stem carries a head 2 surrounded by and supporting a split collar or sleeve 3 forming part of the body or base 4 of the attachment. A clamping screw 5 is threaded through ears of said sleeve and lies across the split and may be adjusted by its handle 6 to solidly clamp the body or base to the shank. On said base is movably supported the X-ray tube 7, which may be of any suitable form and requires no special description. This tube is carried by two like yokes 8 each of which includes two members embracing a reduced portion of the tube. One of said members, such as the lower one in Fig. 2, is solidly secured by the screws 9 to the plate portion 10 of a block 11 and is provided with a bolt 12 pivoted to its outer end and passing through a ring 13 carried by the upper yoke member 14, which is pivoted to the plate 10 at 15. By screwing up the nuts 16 the tube may be secured to the two spaced blocks 11. Blocks 11 are provided with ear portions to which are pivotally connected at 17 the upper ends of curved links 18, which at their lower ends are pivotally connected at 19 to the base or body 4. The blocks 11 are connected together in any suitable manner to provide relative adjustment therebetween during which adjustment the yokes 8 slide on the X-ray tube. The means shown comprises a cylindrical rod 20 provided at its opposite ends with right and left threads 21, 22, threaded into bosses 23 of the blocks 11. Said rod is provided at one end with a rigid milled collar 24 for rotating the same and at its opposite end with an indicating disc 25 whose edge travels along the edge of a plate 26 carried by the adjacent block 11. The edge of said plate is provided with indicating marks 27 numbered to represent distances of the object or plate from the focal spot of the X-ray tube.

It is clear that with the foregoing construction the tube is supported by a frame including the yokes 8 and the bar 20 connecting the same, and that this frame can be swung from left to right in Fig. 6, or vice versa, by a sort of parallel ruler motion. In Fig. 6 the frame is in its intermediate or neutral position, the dotted lines representing its extreme left hand position, there being a corresponding right hand position not shown.

Suitable means is provided for definitely determining both the extreme left and extreme right hand positions. The means shown comprises a pair of annular grooves 28 in the rod 20 which cooperate with a locking member 29 carried by an upwardly extending portion 30 of the base or body 4. This locking device is in the form of a lever pivoted at 31 and whose rear edge is yieldingly pressed against the rod 20 by a compression spring 32. The rod 20 may also have an intermediate annular channel 33 for locating and holding the tube in an intermediate neutral position where it is in convenient position for general X-ray work, although this is not essential.

Let us now assume that the parts are adjusted to the position shown in dotted lines, Fig. 6. In this position the axis of the tube extends along the inclined line C, which is inclined to the horizontal. Therefore the direction of the rays from the focal spot of the tube to the object is along the line D. In this position the locking lever 29 engages the right hand channel 28. $D^1$ represents the direction of the X-ray when the tube is shifted to its corresponding extreme right hand position, with the lever 29 engaging the left end annular groove 28. The grooves 28 are separated by the pupillary distance. Consequently the two positions of the tube are separated by the pupillary distance.

The angle of inclination of the lines D, $D^1$, is due to the fact that the pivots 17 connecting the links 18 to the blocks 11 are separated by a greater distance than are the two pivots 19 connecting the said links to the base or body 4. Moreover, the angle of inclination of the lines D, $D^1$ is varied as the distance between the pivots 17 is varied. Consequently, assuming the tube in one of its extreme positions, rotation of the rod 20 in one direction or the other, separates or causes approach of the pivots 17 and thereby alters the inclination of the lines D, $D^1$. In any of its positions the tube may be adjusted in accordance with the distance of the tube from the object or the plate on which it rests.

The stereoscopic attachment may of course be supported in any suitable manner. The drawings show a support generally similar in construction to the one illustrated in my application for electrical apparatus, filed September 19, 1918, Serial No. 254,780. This support comprises a hollow base 40 in which are located the necessary transformers and other devices for producing and controlling the X-rays. 41 represents a column extending upwardly from said base and to which is hinged at 42 an arm 43. Said arm is provided with a series of diverging outwardly extending posts 44 connected to the arm 43 by the springs 45, said posts at their outer ends being provided with pierced balls 46 through which are led the conductors 47 for carrying current to the tube. The outer end of arm 43 is provided with a sleeve 48 rotatable on said arm on a vertical axis, said sleeve being pivotally connected at 49 on a horizontal axis to a curved arm 50 which at its opposite end is pivotally connected at 51 to the shank 1 of the X-ray attachment. This support enables the X-ray attachment to be shifted around to any desirable position and there held while making the necessary exposures. Between exposures the tube is shifted from one to the other of its two positions, as before stated, so as to secure the proper stereoscopic effect.

What I claim is:

1. A stereoscopic attachment for X-ray machines, comprising a supporting member, a tube frame member, two links connecting said members, and means for varying the distance between the points of connection of said links to one of said members.

2. A stereoscopic attachment for X-ray machines, comprising a supporting member, a tube frame member, two links connecting said members, and means for varying the distance between the points of connection of said links to one of said members, said frame member being shiftable by link motion to either of two positions separated by the pupillary distance.

3. A stereoscopic attachment for X-ray machines, comprising a supporting member, a tube frame member, two links connecting said members, means for varying the distance between the points of connection of said links to one of said members, said frame member being shiftable by link motion to either of two positions separated by the pupillary distance, and means for locking said frame member in either of said positions.

4. Apparatus for producing stereoscopic X-ray photographs, comprising a support, a tube carrying frame mounted upon said support for movement in a definite path to either of two positions separated by the pupillary distance, means whereby movement of said frame along said path from one position to the other automatically tilts the tube to cause its substantial beam of rays in said two positions to converge to a point, and adjusting means for varying the tilting effect whereby the beams in the two positions may be caused to converge to different points at different distances from the tube.

In testimony whereof I affix my signature.

WILLIAM C. DEE.